Jan. 4, 1966 K. M. REHLER 3,226,864
CHARACTER DISPLAY
Filed Oct. 4, 1962
2 Sheets-Sheet 1
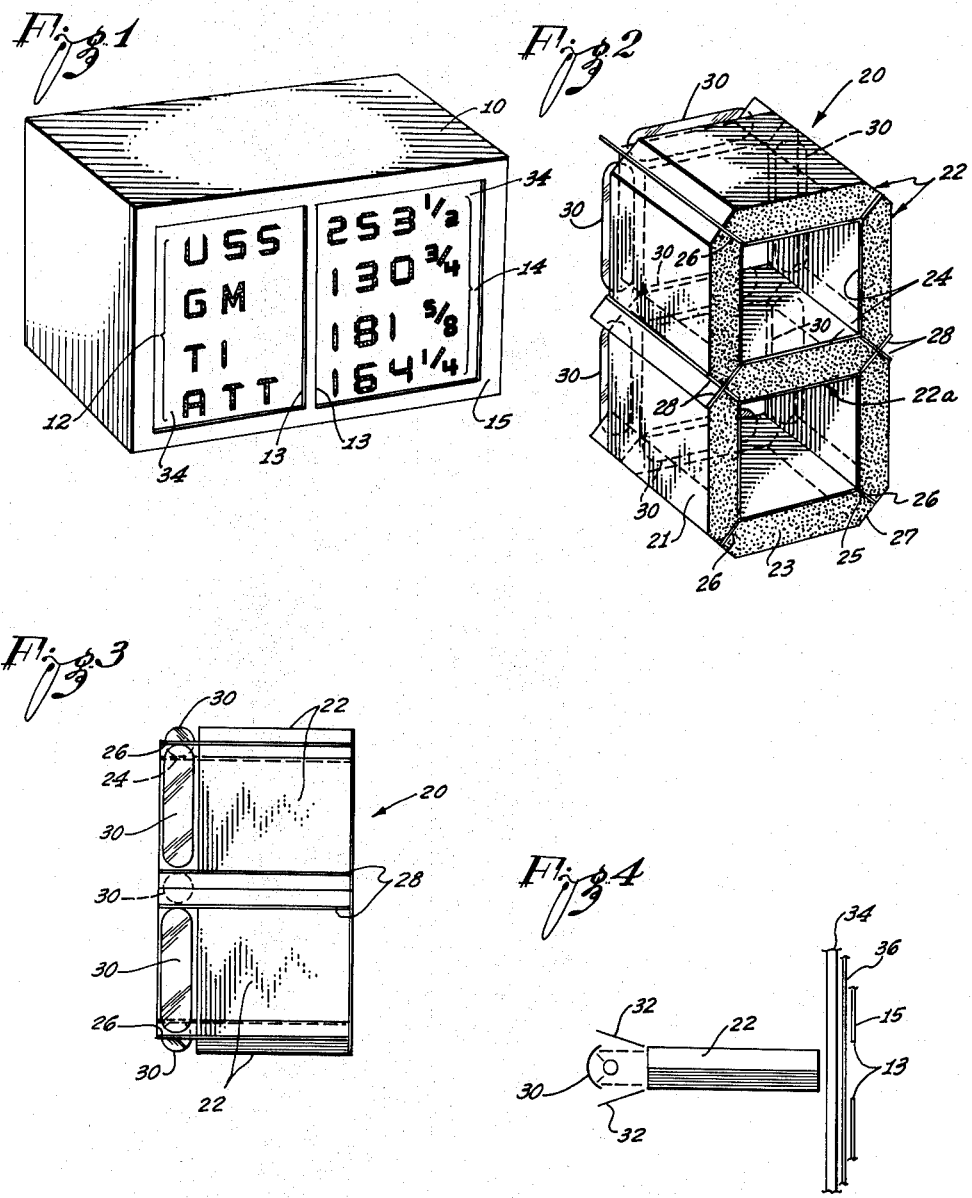
INVENTOR:
Kenneth M. Rehler
By Smyth, Roston & Pavitt
Attorneys Jan. 4, 1966
K. M. REHLER
3,226,864
CHARACTER DISPLAY
Filed Oct. 4, 1962
2 Sheets-Sheet 2
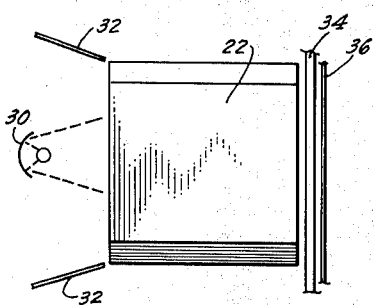
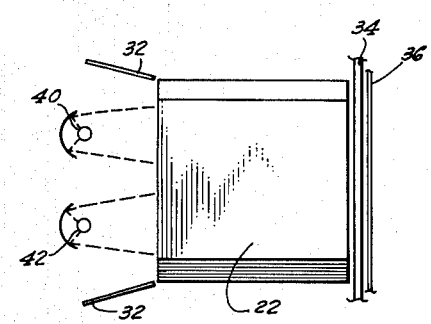
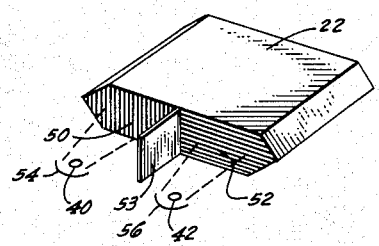
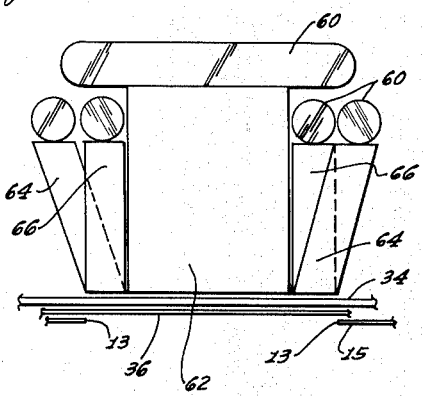
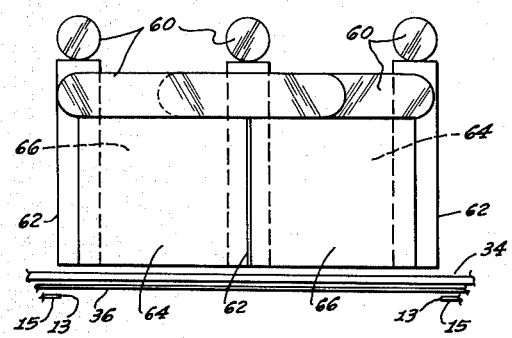
INVENTOR:
Kenneth M. Rehler
By Smyth, Roston & Pavitt
Attorneys

United States Patent Office 3,226,864
Patented Jan. 4, 1966

3,226,864
CHARACTER DISPLAY
Kenneth M. Rehler, 11617 Gorham St.,
Los Angeles, Calif.
Filed Oct. 4, 1962, Ser. No. 228,489
3 Claims. (Cl. 40—130)

This invention relates to the visible display of symbolic information. For example, the invention discloses the display of information such as the letters of the alphabet or Arabic numerals. More specifically, the invention relates to means for conducting the information from a light source to a position to be visibly displayed to an observer.

The invention includes a light conduit or light pipe which may be constructed of a plastic material. The light conduit is disposed with one end adjacent a plurality of light sources and the other end adjacent a semi-opaque viewing surface. The light conduit is segmented in a manner to conduct light representative of a variety of symbols upon the selective energization of appropriate ones of the sources of light adjacent to the one end of the light conduit. The segments of the light conduit are arranged in a pattern to present the variety of symbols as a visual display to an observer. The invention also includes means for preventing leakage of light between the various light sources and segments of the light conduit during the visual presentation of the symbolic information.

A further concept of the invention is the inclusion of means to visibly distinguish the information presented by the light conduit. For example, a plurality of light sources may be operatively coupled to each segment of the light conduit. One or any number of the light sources are energized to produce a particular intensity of light as viewed at the other end of a segment of the light conduit. However, it is also possible to energize a different number of the light sources in response to the same or different information so as to couple an increased amount of light through a segment of the light conduit. In this way, the different types of information may be distinguished, one from the other, by the various intensities of the visibly presented information. Also, the same information may be distinguished for particular periods of time to call attention to the information.

The invention also provides an additional means for distinguishing between information. A segment of the light conduit may have coupled to one end selective filters, each of the filters acting to pass a particular wave length of the light energy so as to present a particular color at the other end of the segment. A source of light is coupled to each of the light filters so that, upon the proper energization of the appropriate light source, the symbolic information is visibly displayed in a particular color.

The invention also provides different configurations for the plurality of segments of the light conduit so as to use various types of light sources. For example, the invention provides offsetting the segments at various angles with the segments having selective heights so as to accommodate high vacuum type glow tubes. These tubes are advantageous in that they can be instantaneously energized or de-energized, thereby decreasing the time required to display successive symbols.

In the drawings:
FIGURE 1 is a perspective view of a display unit using a plurality of the light conduits of this invention, the display unit showing a general application of the invention in the presentation of stock market quotations;
FIGURE 2 is a perspective view of the light conduit according to this invention as seen from a front position and illustrating segmented portions forming the light conduit;
FIGURE 3 is a side elevational view of the light conduit of FIGURE 2 as seen from the left side of the conduit in FIGURE 2;
FIGURE 4 is a top plan view illustrating the operation of an individual light-conducting segment and further illustrating the application of the light source to the segment with subsequent transmission of the information to a light screen;
FIGURE 5 is a top plan view of the light segment shown in FIGURE 4;
FIGURE 6 is a top plan view of a light segment similar to that shown in FIGURES 4 and 5 except illustrating the use of a plurality of light sources for each light-conducting segment;
FIGURE 7 is a perspective view of a modification of the light-conducting segment shown in FIGURE 6 and illustrates the use of filters to provide a dual operation of the light segment;
FIGURE 8 is a top elevational view of a modification of the light conduit shown in FIGURE 2 with specific application toward the use of high vacuum glow tubes; and
FIGURE 9 is a side elevational view of the light conduit shown in FIGURE 8.

FIGURE 1 shows a general application of the light conduits of the invention. A housing 10 incorporates a plurality of the light conduits with associated circuitry to activate the light conduits for visually displaying symbolic information. The information may constitute, for example, selected stock market quotations at any given time. The area 12 on the face of the housing 10 may be used to indicate abbreviations of the names of various companies. The area 14 indicates the corresponding quotation as to the price at which the stocks of the companies are selling. The displays in the areas 12 and 14 may be obtained by providing openings 13 in a front panel 15 of the housing 10. The display unit may incorporate an automatic means so as to continuously change the stock quotations as further information as to price is received. As will be appreciated with respect to the apparatus of FIGURE 1, the articles constituting this invention may be used to visually display numbers, letters, alphanumeric characters or any other desired characters.

The display 10 includes stages indicated in block form in FIGURE 1 for producing signals on a plurality of output lines in different combinations in representation of individual information such as numeric information. Such stages are well known in the prior art and are not considered as forming a part of this invention. For example, seven output lines may be provided when the embodiment shown in FIGURE 2 is used. These output lines may be individually energized in different combinations to represent different numbers.

FIGURE 2 shows an individual light conduit generally designated at 20, this conduit being used in FIGURE 1. More specifically, FIGURE 2 shows a conduit used to visibly display Arabic numerals. The light conduit 20 is composed of a plurality of light-conducting elongated segments 22. The segments 22 may be constructed of plastic material or of crystal material so as to transmit light applied to one end of a segment to the other end. For example, the segments 22 may be formed from a transparent, light-conducting material having a polymethyl methacrylate composition and designated by the trademark "Lucite."

As seen in FIGURE 2, the members 22 are provided with a pair of parallel, elongated flat surfaces 21 and with end faces 23 which are provided with a relatively narrow thickness. The upper and lower edges of the faces 23 are inclined at an angle such as 45° as indicated at 25 so as to form an abutting relationship with the inclined edge of the adjacent members. The edges may be further bevelled as indicated at 27 to facilitate the visual presentation of the various Arabic numerals.

As further illustrated in FIGURE 2, seven members are provided although it will be appreciated that a different number may also be provided. The members 22 are disposed in adjacent relationship to define a pair of squares at the end faces 23 with one of the members designated as 22a being common to each of the two squares. As will be seen in FIGURE 2, the adjacent disposition of the two squares formed by the members 22 defines the numeral "8."

As shown in FIGURE 2, all of the light-conducting segments 22 have the same cross-sectional configuration and physical size, but it will be appreciated that the length, width and thickness of the light-conducting segments may be varied so as to incorporate modifications of the invention. Also, the number and physical relationship of the segments may be varied in a variety of patterns so as to visibly display other types of symbolic information such as alphabetical letters and alphanumeric characters.

Another aspect of the invention illustrated in FIGURE 2 is the provision of shielding members at appropriate places in the conduit 20 so as to prevent the extraneous leakage of light between adjacent segments 22 when only one of the adjacent segments 22 is transmitting light. The configuration of the segments 22 shown in FIGURE 2 uses three types of shielding members, each of which may be made from a suitable material such as a thin cardboard. As an alternative, the shielding members may be formed integrally as by molding at the ends of the segments 22. For example, shielding members 24 are applied to the inside surfaces of the light-conducting segments so as to prevent the coupling of light energy between the inside surface of the individual segments 22. Shielding members 26 are also provided at the four corners of the light conduit 20 between the inclined edges 25 of the adjacent segments 22 to prevent the coupling of light energy to the edges of the segments 22 at the corner portions of the light conduit 20. An X-type of shielding member 28 which is similar to the members 26 may be used at places where three segments meet. The shielding members 24, 26 and 28 extend beyond the segments 22 at the ends of the members 22 opposite to the front panel 15 of the housing 10 so as to define recesses. Light sources 30 are positioned in the recesses by the rearward extension of the shielding members, as illustrated in FIGURE 3. This prevents extraneous coupling from the light source to segments other than the one to which the light source 30 is coupled.

FIGURES 4 and 5 illustrate the operation of an individual light-conducting segment 22 when the segment is energized by the light source 30. Shielding means 32 represent the various types of shielding members 24, 26 and 28 which are included to prevent extraneous coupling of light. A semi-opaque screen 34 is positioned behind the front panel 15 of the housing 10 to increase the angle at which the display may be viewed effectively. It will be appreciated that the end of the segment 22 adjacent the semi-opaque screen may be treated to have a semi-opaque surface so as to eliminate the necessity of a separate screen. A light filter 36 may be positioned between the semi-opaque screen 34 and the front panel 15 of the housing 10 to pass light only of a particular color such as yellow or white.

Each light source 30 is energized in accordance with the position occupied by the segment in relation to the symbolic information which is to be visually displayed. It can be readily seen that by varying the selective energization of the light sources 30 associated with the different segments 22, it is possible to display light information representative of any Arabic numeral. It is also possible to visually display other types of symbolic information if the segments 22 are constructed to form different patterns.

The light energy from each light source 30 is radiated to one end of the adjacent segment 22. Since each segment 22 is constructed of material which channels the light, the segment operates as a light pipe to conduct the light energy in a longitudinal direction through the segment. The light is then applied to the semi-opaque screen 34 to present an image of the transmitted information to an observer. The semi-opaque screen operates to increase the viewing angle of the image since the light is diffused as it passes through the screen so as to be scattered through a wide angle.

The invention may also use the filter 36 to provide a desired color to the information which has been transmitted through the segment 22. Since an ordinary light source radiates a spectrum of light which has a yellow-orange appearance, the filter can be included to facilitate the manner in which the image is visually distinguished. For example, the filter may pass the appropriate wave lengths of the light so as to have the image appear blue. Also, the filter may pass only green or red or any other color so as to give a distinctive coloring to the information.

FIGURE 6 shows the operation of the segment 22 using a plurality of light sources. For example, a pair of light sources 40 and 42 may be disposed adjacent to one end of each segment 22 to radiate light to the segment. The light source 40 and the light source 42 may be individually energized or the two light sources may be energized in parallel. If the light sources are energized in parallel, the system operates to provide an image even though one source may fail. This provides a fail safe operation of the light transmission system since one source still transmits the information even though the other may be inoperative. The intensity of the visible light to the observer is diminshed to indicate that there is a failure in the operation of one of the light sources. This provides the observer with an indication of the necessity for replacing the inoperative bulb even while the display unit is continuing to operate. As an alternative to using two separate bulbs, each bulb may be provided with two filaments.

It is also possible to use the sources 40 and 42 as a means of transmitting multiple information using a single section 22. If the single source 40 is energized, the visible light to the observer has a particular intensity. Although the light source 40 is displaced to one side of the light segment 22, the segment averages the light out during transmission to present light of a substantially constant intensity along the entire face 23 of the segment. In this way, the observer does not see an appreciably greater amount of light at one corner of the face 23 on the segment 22 than at the other corner of the face.

The light source 42 is used as a means of giving a different quality to the light which is transmitted through the segment 22. If the light energy from the source 42 is added to the light energy from the source 40, the intensity of the image seen by the observer is increased. It is, therefore, possible by selectively energizing either one or two of the light sources to present information which has either a brighter or a duller appearance and this may be used as a means of distinguishing between different types of information. It will be appreciated that the invention is not limited to the use of just one or two of the light sources, but any number may be used as a means of selectively distinguishing between different types of information.

FIGURE 7 illustrates the light-conducting segment 22 of FIGURE 6 modified to include a filter structure located intermediate the light source 40 and 42 and the segment 22. The filter structure comprises two filter elements 50 and 52, each occupying a portion of the end surface of the segments 22. The filter elements 50 and 52 may be respectively provided with characteristics for passing light energy having wave lengths representative of different colors such as red and green. The light sources 40 and 42 may be individually positioned adjacent to each of the filter elements 50 and 52 to radiate light to the elements. Reflectors 54 and 56 may be associated with the light sources 40 and 42 to direct light to the respective one of the filters 50 and 52 and to inhibit the passage of light to the other filter. A shield member 53 is disposed between the filter elements 50 and 52 to prevent intercoupling of light energy between the filter elements 50 and 52.

When the light source 40 is energized, the properties of the filter 50 determine the wave length of the light energy which passes through the segment 22. The segment averages the light throughout the entire area of the segment so that the entire front face 23 of the segment 22 is illuminated to display a particular color such as red. The light from the source 42 passes through the filter 52 to provide an illumination of the entire front face 23 of the segment 22 with a different color such as green. Both light sources 40 and 42 may also be energized to illuminate the front face 23 of the segment 22 with a color which is the combination of the light energy passed by the filters. In this manner, the use of two filters and two light sources produces an information image having three possible colors. It will be appreciated that any number of filters may be used with a corresponding plurality of light sources to represent different patterns of information. Also it will be appreciated that the light sources 40 and 42 may be designed to radiate light energy of only particular wave lengths so as to eliminate the necessity of separate filters.

The previously disclosed embodiments of the invention have related to light sources in general. For example, incandescent lamps having a variety of sizes are available for different size light conduits. The invention also provides for the use of other types of light sources. For example, high-vacuum glow tubes may be used. The glow tubes may be triodes of "Amperex" type 6977. This type of glow tube is anode excited at +50 volts and is conductive for a voltage on the grid which is near ground. When the grid voltage falls below —6 volts, the tube is cut off. These glow tubes have an advantage over the incandescent lamps since the glow tubes operate with a faster response to energization and de-energization than incandescent lamps. The glow tubes, however, are longer than the available incandescent lamps such that a realignment of the elements of the light conduit may be desired.

FIGURES 8 and 9 respectively provide a top elevational view and a side elevational view of a light conduit constructed to operate with glow tubes 60. The light conduit is provided with three identical segments 62 and two sets of identical side segments 64 and 66. The segments 62 are constructed to have a larger length rearwardly from the front panel 15 of the housing 10 than the side segments 64 or 66. This is to allow the glow tubes 60 situated on the ends of the segments 62 to be disposed rearwardly of the glow tubes 60 which are situated on the ends of segments 64 and 66. In this way, the glow tubes 60 on the segments 62 are displaced from the glow tubes on the segments 64 and 66.

It may be also necessary or desirable to offset the segments 64 from the segments 62 since the size of the glow tubes 60 may require a longer length than is available along the ends of the segments 64 and 66. This is obtained by disposing the segments 66 in perpendicular relationship to the segments 62 and the front panel 15 of the housing 10 and by inclining the segments 64 outwardly from the segments 66 with progressive distances from the front panel 15. However, as best seen in FIGURE 8, the segments 64 and 66 have an alignment of their faces at positions adjacent to the front panel 15.

This application has been disclosed with reference to particular applications and embodiments but it will be appreciated that other modifications and adaptations may be made and the invention, therefore, is only to be limited by the appended claims.

What is claimed is:

1. In combination for use with a display system for visually displaying individual information in the form of individual characters, including,
   a plurality of elongated light sources,
   means operatively coupled to the plurality of elongated light sources and responsive to the individual information to energize the plurality of elongated light sources in different combinations in representation of the individual information, and
   a plurality of elongated light conductive segments each having two oppositely disposed end faces with a first end face of each segment abutting one another and disposed in a first plane and with the second end face of each segment offset one from the other,
   individual ones of the elongated light sources in the plurality having the axis parallel and disposed adjacent the offset second faces of the different light conductive segments to direct light energy through the segments to the first end faces in accordance with the energizing of the individual ones of the light sources,
   the light conductive segments being disposed relative to one another to provide a visual display of the individual characters at the first end faces of the segments in accordance with the combination of the light segments receiving light energy from the light sources at each instant.

2. The combination of claim 1 wherein the second end faces of different elongated light conductive segments are at different distances from the first end faces of the segments to provide for a disposition of the individual light sources in adjacent relationship to the associated light conductive segments.

3. The combination of claim 1 wherein particular ones of the light conductive segments in the plurality are angularly inclined relative to other light conductive segments in the plurality to provide the offset relationship.

References Cited by the Examiner

UNITED STATES PATENTS

| 2,374,408 | 4/1945 | Braidwood | 40—130 X |
| 2,431,091 | 11/1947 | Thomas | 40—130 X |
| 2,443,561 | 6/1948 | Greenwald | 40—130 X |
| 2,567,046 | 9/1951 | Anderson | 40—130 X |
| 2,812,607 | 11/1957 | Briggs | 40—130 |
| 2,619,068 | 11/1952 | Malheiros | 40—130 X |
| 2,740,957 | 4/1956 | Davies | 40—130 X |
| 2,843,845 | 7/1958 | Vozza | 40—132 |
| 2,981,020 | 4/1961 | Brooks | 40—130 |
| 2,994,972 | 3/1961 | Meisenheimer | 40—130 X |
| 2,998,597 | 8/1961 | Edwards | 40—130 X |
| 3,081,450 | 3/1963 | Sinninger | 40—130 X |

FOREIGN PATENTS

| 673,735 | 6/1952 | Great Britain. |
| 847,972 | 8/1961 | Great Britain. |

EUGENE R. CAPOZIO, *Primary Examiner.*

JEROME SCHNALL, *Examiner.*